United States Patent [19]

Doundoulakis

[11] 4,217,649
[45] Aug. 12, 1980

[54] DIGITIZER FOR LOCATING THE POSITION OF A STYLUS POINT ON A WRITING SURFACE

[76] Inventor: George J. Doundoulakis, 2498 Kayron La., North Bellmore, Long Island, N.Y. 11710

[21] Appl. No.: 950,389

[22] Filed: Oct. 11, 1978

[51] Int. Cl.² .................... G01B 15/00; G01C 15/02
[52] U.S. Cl. .................... 364/556; 364/559; 364/516; 178/19; 250/216; 250/236
[58] Field of Search ............... 364/516, 525, 556, 559; 235/92 MP; 356/375; 250/203, 216, 558, 561, 568, 236; 340/190; 178/18-20; 33/1 M

[56] References Cited

U.S. PATENT DOCUMENTS

| | | | |
|---|---|---|---|
| 3,457,646 | 7/1969 | Schwemin | 250/236 |
| 3,809,893 | 5/1974 | Dobras | 250/568 |
| 3,911,270 | 10/1975 | Traub | 250/216 |
| 3,917,955 | 11/1975 | Inuiya | 250/216 |
| 4,081,603 | 3/1978 | Davis et al. | 178/19 |

*Primary Examiner*—Charles E. Atkinson
*Assistant Examiner*—Gary Chin

*Attorney, Agent, or Firm*—Constantine A. Michalos; Peter C. Michalos

[57] ABSTRACT

A Digitizer for determining the location of a point of contact between a stylus and a surface comprising a rotating light projector for projecting a single light beam having two spaced apart light boundaries, a light sensing stylus spaced from the rotating light projector for sensing the passing of the light boundaries emitted from the rotating light projector, and a logic circuit connected between the rotating light projector, and the light sensing stylus for converting information coming from the rotating light projector, as to the angular position of the light beam and information coming from the sensing stylus, as to the time of the passing of the light boundaries, into digital information. The rotating light projector includes a rotating turntable having at least one light focusing lens thereon with a fixed shielded light source spaced from the turntable and cooperating with the rotating light focusing lens to produce a light beam having a predetermined angle of convergence. The light beam is projected toward the light sensing stylus which is in contact with a writing surface.

19 Claims, 9 Drawing Figures

DIGITIZER FOR LOCATING THE POSITION OF A STYLUS POINT ON A WRITING SURFACE

FIELD OF THE INVENTION

The present invention relates in general to digitizers for converting the position of a writing implement such as a stylus or a pen on a writing surface into digital information readable by a computer and, in particular, to a new and useful device for precisely determining the coordinates of a contact point between a writing implement and a writing surface using stationary non-rotating light source which projects through rotating optical means for producing a single rotating light beam having spaced apart light edges at a predetermined angle of convergence and a light sensing stylus which reacts to the passing of the two light edges.

DESCRIPTION OF THE PRIOR ART

The increasing use of digital computers to process all forms of information has led to the development of devices which can convert normal handwriting into computer readable information. Some prior art solutions to this problem include dividing a writing tablet into small increments on which a written character is to be formed. These increments are further divided into a number of segments which sense the shape of the character formed on the increment by the passage of a writing implement by sensing which segment are written upon.

A more flexible mechanism has been devised which senses the direction of movement of the writing implement at known time interval and thus can sense the shape of a written character. Still further attempts at solving this problem include a complex tablet having electromagnetic sensing characteristics which detect the passing of the writing implement.

A common defect of all the prior art digitizing methods is the complexity of the tablet on which the writing surface is disposed and/or the complexity of the mechanism in the writing stylus itself which is required to read simple written information.

A device is also known in U.S. Pat. No. 3,457,646 to Schwemin dated July 29, 1969, in which a laser beam operated X-Y Table is disclosed. This patent is relevant to the present invention as it discloses alternative methods and apparatus which have been used to locate the position of a stylus or a pen on a writing surface.

SUMMARY OF THE INVENTION

The present invention utilizes a rotating light projector which can be disposed for example in an upper corner of a writing surface and which projects a single light beam of a known convergence toward the writing surface. A light sensing stylus is contactable with the writing surface to indicate a position of contact or to produce written characters and includes light gathering means at its writing end which gathers and channels the light coming from the light beam of the rotating light projector. The stylus further includes a light sensor such as a photocell or a light sensitive transistor, which receives the gathered and channeled light and converts it into an electronic impulse. Alternatively, the stylus is provided with a light sensor in the form of a photocell or the like near its point of contact with the writing surface in order to sence the passing of the light beam.

The rotating light projector forms a beam of a substantially rectangular cross section having lateral edges or boundaries. The lateral edges or boundaries of the light beam may either be parallel or converge to a point at a predetermined distance from the rotating light projector. With a knowledge of the optical system in the rotating light projector, the convergence of the light beam can be determined using simple trigonometric functions hereinafter to be explained. The electronic impulse formed in the stylus by the passing light from the projector forms a square pulse function having a duration corresponding to the known spacing of the light boundaries, at the stylus. It should be understood that the width of the light beam changes as the stylus is moved away from the light source.

A logic circuit arrangement is connected between the rotating light projector and the light sensing stylus which reads the timing and duration of the impulses coming from the light sensing stylus. This circuit is pre-programmed with the constant rotational speed of the rotating light projector and the predetermined or calculatable width between the light boundaries. The light sensing and writing stylus may include switch means which activates the light sensor only when the stylus is pressed down against the writing surface in the act of writing, so that the digitizer functions only when actual writing is performed.

The rotating light projector further includes an indexing means which sends an indexing impulse to the logic circuit arrangement. The indexing means corresponds to the angular position of the rotating light projector when the light beam is at a predetermined origin, a known position, for example, parallel to an X-axis of a rectangular coordinate system.

The logic circuit arrangement further includes a clock feeding a counter which starts when the indexing impulse is received and which ends when the next indexing impulse is received. The readings of the counter, as the edges of the rotating light beam are detected by the stylus sensor, correspond to angular displacements of the edges of the beam at the stylus from the indexing position. The average of these two counter readings correspond to an angular displacement of the center of the light beam as it sweeps across the writing surface and, assuming the rotating light projector was disposed at the upper left hand corner of the writing surface, the angular polar coordinate for the position of the contact point between the stylus with respect to the indexed origin and the writing implement can thus be ascertained. Further utilizing the known rotational speed of the projector and the known width between the light boundaries, the time duration of the impulse coming from the light sensor in the stylus in terms of the readings of the counter as the edges of the beam are detected, can be converted into information usable with basic trigonometric functions to ascertain the X and Y coordinate positions of the contact point.

All calculations and timings required to determine the position of the stylus on the writing surface, can be accomplished using microprocessors which are known per se and an example of which will be disclosed hereinafter.

The stylus or pen may be connected to the logic circuit arrangement by wires or alternatively through a transmitter and receiver combination. A small transmitter can be provided within the body of the stylus or pen which includes an antenna and a receiver may be provided within the logic circuit arrangement for receiving impulses from the pen transmitter. The switching means for activating the light sensor may be connected to the transmitter for activating the receiver only when actual writing is in progress. The pen may be provided with an antenna, for example, in the form of a metal tube of a metallic ball point insert which transmits only a short distance to a foil underlying the writing surface. The transmitter can be provided of a power sufficient to transmit to the logic circuit only when the pen is in close proximity with the writing circuit so that false impulses from similar digitizers in the same room, are not received.

The object of the present invention is thus to provide a digitizer which utilizes a rotating light source having a beam of predetermined convergence which can be rotated past a light sensing stylus to generate digital information which is usable with trigonometric functions to determine the distance between the known position of the rotating projector and the unknown position of the stylus.

Another object of the present invention is to provide the rotating light source of projector with an indexing means which produces an impulse when the rotating projector is at a predetermined position so as to create a reference point of origin from which the angular position of the stylus contact point on the writing surface can be ascertained.

Another object of the present invention is to provide a stylus which includes a light sensor at the base thereof with a transmitter for transmitting light impulses to the receiver of a logic circuit.

A further object of the invention is to provide a stylus which includes light gathering and channeling means which gather and channel light coming from the rotating light projector into a light sensor in the stylus for converting the timed incidence of the light beam coming from the rotating light projector into electronic impulses usable to determine the position of the stylus.

A still further object of the present invention is to provide a light sensing stylus which includes a contact activated switching means connected to the light sensor and which permits the light sensor to operate only when the stylus is contacting the writing surface.

A further object of the present invention is to provide a digitizer which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be made to the accompanying drawings and descriptive matter in which there is illustrated a preferred embodiment of the invention.

DESCRIPTION OF THE PREFERRED EMBODIMENT

Figure 1:
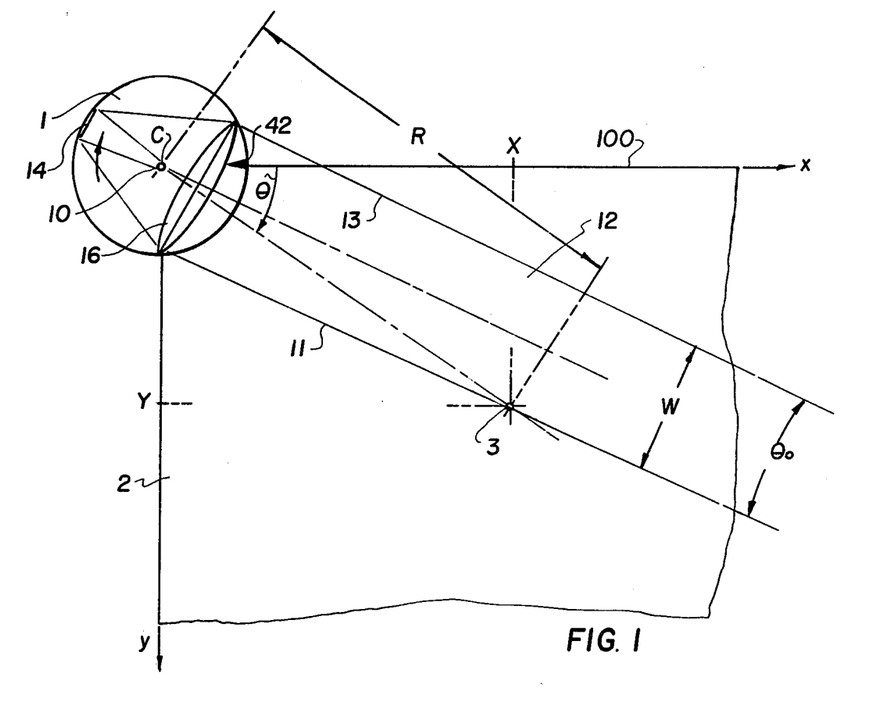
FIG. 1 is a schematic plan view illustrating the principle of the invention.
Figure 2:
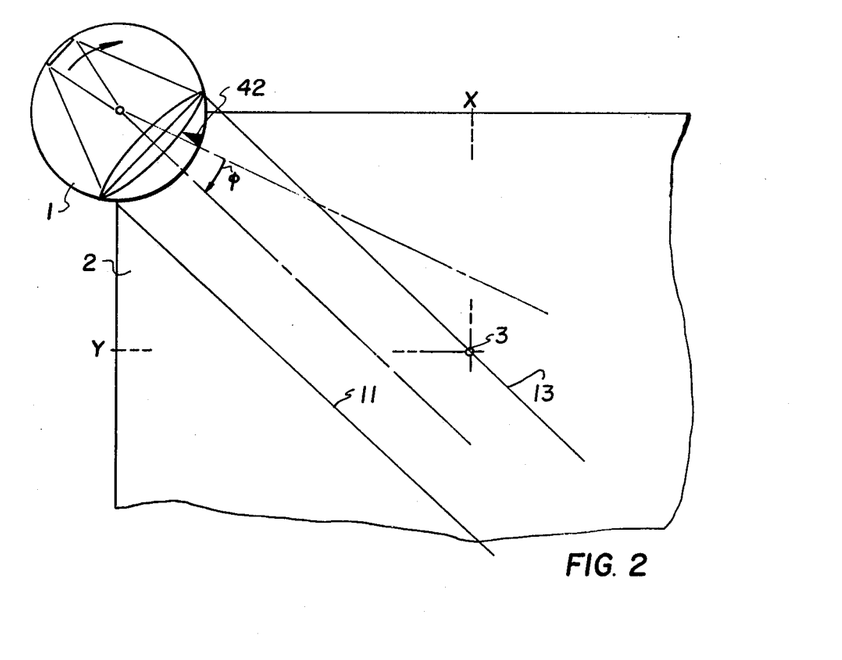
FIG. 2 is a view similar to FIG. 1 taken after a time increment showing the position of the rotating turntable.

Referring now to the drawings, FIGS. 1 and 2 are explanatory diagrams representing a digitizer for locating the point of contact between a stylus or pen point and a surface to be used, for example, as an input for a computer programmed to accept graphic data as produced by the pen or stylus, comprising a rotating table 1 with a center of rotation C, at which one light source 10 is positioned. Light is reflected from source 10 to mirror 14 and through lens 16 to form a beam 12 with respective light beam edges 11 and 13 converging to a point. The edges 11 and 13 forming an angle $\theta_o$. Surface 2 is provided for accepting a writing stylus or pen point 3. The stylus or pen point is provided with a light sensing means. Interposed between the stylus and the rotating table are associated electronic circuits for converting the analogue written information readable by a computer hereinafter to be described.

The general principle of the invention and its operation are as follows. The table 1 rotates at constant known speed with a period of T seconds per rotation. At a time $t = t_1$ (FIG. 1) the leading beam edge 11 passes the point 3 and an impulse in the form of a step wave is sent to the circuitry associated with the stylus or pen point at 3, through the light sensing means at the stylus or pen point. At a second time $t = t_2$ (FIG. 2) the trailing beam edge 13 passes the same point 3 and the impulse ends. This interval $t_2 - t_1$ or dt is measured by the circuitry and further using the known period of rotation T and the basic geometric formula:

$$dt/T = W/2\pi R$$

where W is the distance between the beam edges 11 and 13 for a parallel edge or a non-converging light beam 12, ($\theta_o = 0$) and R is the radial distance between the center C of the table 1 and the point 3. Since dt, T, and W are known the solution for the unknown position R of the point 3 is:

$$R = WT/2\pi dt$$

A reference angle $\theta$ (FIG. 1) is determined using a clock or timing circuit which measures the time between the position of the table 1 when edges 11 and 13 are parallel to the X-axis 100 and the position when table 1 has rotated so that edge 11 has passed the point 3. Again, since T is known, $\theta$ can be found using appropriate relationships and circuitry.

Having found the values of $\theta$ and R, a logic circuit such as a microprocessor, is used to convert the values into rectangular coordinates in terms of x and y. The rotational period of the table 1 is kept high and/or several lenses 16 are used so that a rapid succession of position values can be fed into, for example a computer to be used for any purpose requiring the sensing of a stylus point position.

The Light Projector

Figure 3:
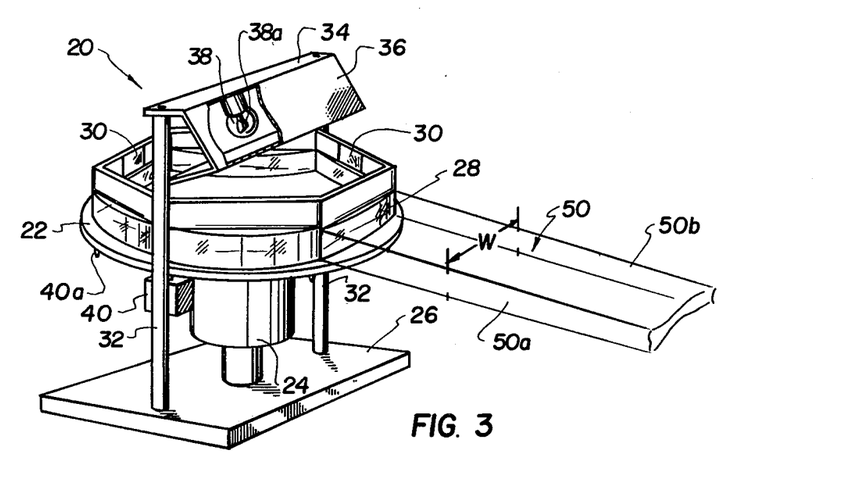
FIG. 3 is a perspective view of a preferred embodiment of the invention.

Referring to FIG. 3, a preferred embodiment for the projector comprises a rotating light projector generally designated 20 having a rotating platform or turntable 22 rotated by a motor 24 which is mounted on a base 26 and may be of the record player type or preferably a synchronous motor. Rectangular focusing lenses 28 are arranged in a regular polygonal shape, in this case a hexagon, on the rotating table 22. Each lens 28 can be cut from a circular lens of radius of r. Above each rectangular lens 28 is disposed a rectangular reflecting mirror 30. Uprights 32 are mounted on the base 26 and support a cross member 34 which in turn supports a light shield or barrier 36. Cross member 34 supports a stationary lamp or light source 38. As can be seen from the drawing, the supports 32, 32 as well as the shield 36 and lamp 38 are stationary with respect to the rotating turntable 22. Lamp 38 has a substantially vertical filament 38a, located substantially along the axis of the rotating table 22.

Figure 7:
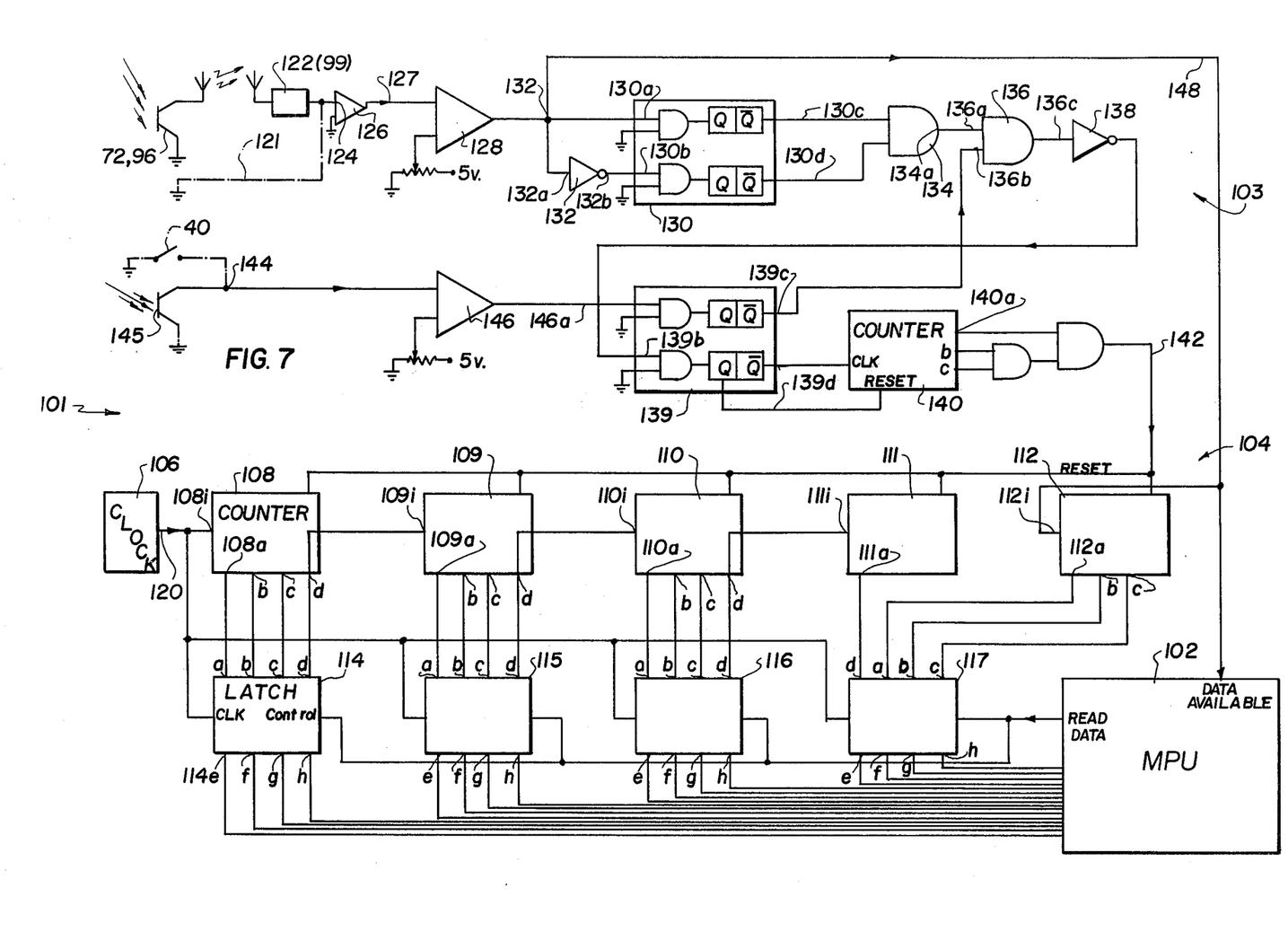
FIG. 7 is a schematic representation of the logic circuit connected between the light sensing stylus and the rotating light projector.

Further included on one upright support 32, is an indexing means 40 which produces an electronic impulse usable in the circuitry of FIG. 7 when the rotating turntable is at a known, predetermined angular position.

In operation, as turntable 22 rotates, due to the action of motor 24, the light emitted from lamp filament 38a is reflected from one of the mirrors 30 which is opposite the shield 36. The light from the lamp 38 is reflected by the mirror 30 toward and through the rectangular focusing lens 28 positioned opposite to the mirror, to produce a rectangular light beam 50 having spaced apart light edges or boundaries 50a and 50b. The width or spacing between the boundaries 50a and 50b are a known value W for parallel edges 50a and 50b or can be calculated for converging edges. It is advantagous for rectangular focusing lenses 28 to be shaped to produce a rectangular light beam 50 which converges as the light progresses further from the focusing lens 28. This is to prevent an unavoidable dispersion of light and also to improve the accuracy and resolution of the instrument.

Indexing means 40 of FIG. 3 correspond to the schematic indexing mark 42 in FIGS. 1 and 2 is utilized to determine the $\theta$ value as previously explained. As each indexing activator 40a passes the means 40, an indexing impulse is sent to the circuitry.

Figure 4:
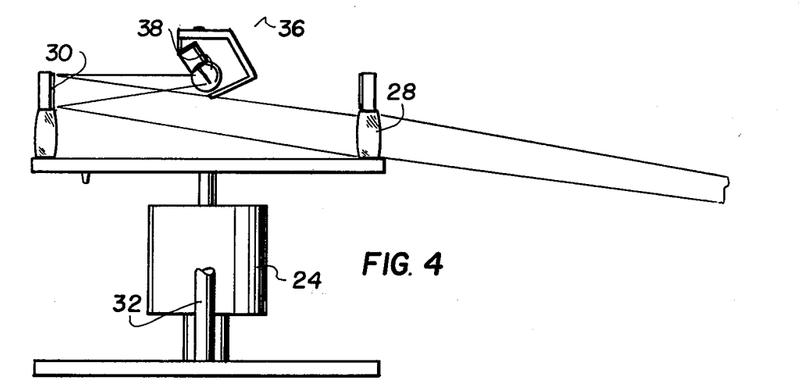
FIG. 4 is a side elevation of the embodiment shown in FIG. 3.
Figure 5:
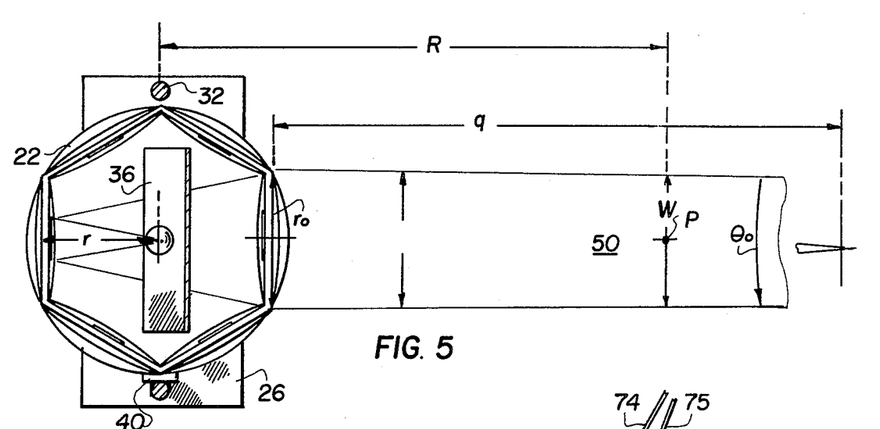
FIG. 5 is a top plane view of the embodiment shown in FIG. 4.

FIGS. 4 and 5 illustrate the light path taken by the light coming from the lamp 38.

The relationships used in the invention are now described with referance to FIG. 5, where the distance between lens and luminous filament is represented by "p" approx. (p=3r) and the distance of the image from the lens is "q", while "f" will stand for the focal length of the lens, then from known lens equations;

$$1/p + 1/q = 1/f \tag{1}$$

For $f=3.43''$, $p=4.72''$ $q=12.55$

With the pen situated at a point P whose distance from the center of rotation is R, let the width of the beam at P be "W", let the distance of the lens from the point of rotation be r, Then;

$$W/2 = [q - (R-r)] \tan \theta_o/2 \tag{2}$$

For $r = 1.72$ $$W = 2(14.27 - R) \tan \theta_o/2 \tag{2a}$$

Where $\theta_o$ is the angle of convergance between the edges of beam 50. With a lense radius of $r_o$, $$\tan \theta_o/2 = r_o/q; \tag{3}$$

then;

$$W = 2[q - (R-r)] r_o/q \tag{2b}$$

For $q=12.55$; $r=1.72''$; $r_o=0.875''$ $W=(14.27-R)$ 0.139R

With T being the period of a full rotation of the table and dt being the time during which the point P remains illuminated as the beam rotates, then;

$$\frac{dt}{T} = \frac{W}{2\pi R} = \frac{q - (R-r)\frac{r}{q}}{R} \tag{4}$$

which can be solved for R $$R = \frac{Tr_o(q + r)}{\pi q dt + Tr_o} \tag{5}$$

For a table rotating at 300 r.p.m., T=0.2 sec and if we set $q=12.55''$; $r=1.72''$; $r_o=0.875''$ $$R = \frac{0.175 (12.55 + 1.72)}{40.84 \, dt + 0.175} \tag{5a}$$
$$= \frac{14.27}{225.3 \, dt + 1}$$

Conversely, equation (5a) may be solved for dt in terms of R; then $$dt = (14.27 - R)/225.3 \, R \tag{6}$$

From equation (6) we see that for R=2" Dt=0.027 sec.
for R=14" Dt=0.000085 sec.

Which imply a variation of 0.0019 sec. per inch of variation of R. At a clock frequency of 100 KHz the count during the time the pen will remain illuminated will change at about 190 pulses per inch of variation of R, one count for every 0.005 of pen position. If greater radial resolution is required, the clock frequency can be adjusted accordingly.

The azimouthal resolution varies with R during a full period T, at 300 r.p.m. (=5 r.p.s) we have a clock count of (100,000) 100,000/5 pulses or 55 pulses per degree.

For R=2 Resolution 0.00159 inches per pulse;
R=14 Resolutions 0.0044 inches per pulse As shown in FIG. 3 six lens/mirror systems are used in a single turntable. This brings the repetition of readings to 30 per second. Again, if more readings per second are required, the motor r.p.m. can be increased. As it is now the 300 r.p.m. is a relatively low speed, which can be easily achieved at low vibration and wear.

Even with more than one beam, scanning the tablet at any instant, the aximouthal angles for each of the six beams can still be defined with respect to a single reference zero rotation of the turntable. Variation in the turntable speed will be detected from the total clock count during each full rotation of the turntable. The differential motion of the pen can be calculated by the computer from successive readings by each beam.

Only the clock count at the edges of each beam from the reference zero of the turntable will be latched as hereinafter to be described, and be available to be picked up by the computer. The computer will compute R from equation (5a) where dt will be the difference between this successive readings and the azimouthal angle from the average of such readings. The rectangular coordinates can be calculated by the computer from the known tranformation equation from polar to rectangular:

$$X = R \cos \theta; \ y = R \sin \theta \qquad (7)$$

The Stylus

Figures 6, 8, 9:
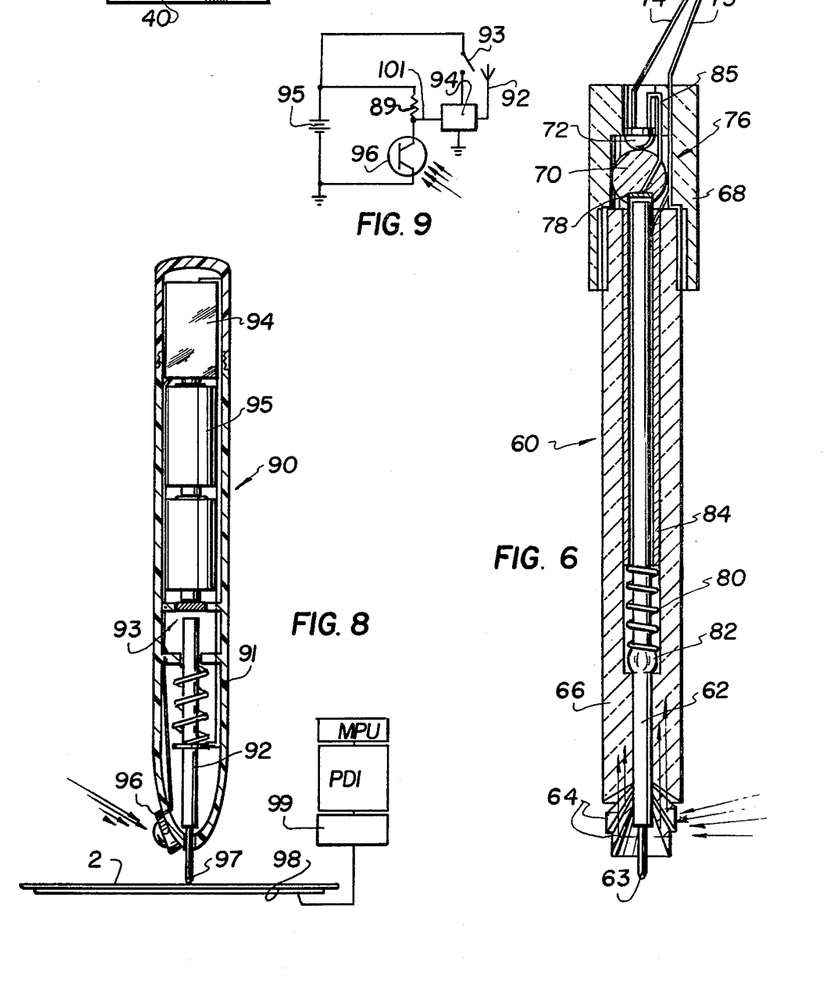
FIG. 6 is a cross sectional side view of the light sensing stylus.
FIG. 8 is a cross sectional side view of an alternate form for the light sensing stylus.
FIG. 9 is schematic representation of the circuitry for the pen embodiment of FIG. 8.

Used in conjunction with the projecting means 20 are light receiving or light sensing styluses generally designated 60 and 90 (FIGS. 6 and 8).

Referring to FIG. 6, the stylus 60 comprises a writing insert 62 which includes a writing point 63 which corresponds to the schematic point of contact 3 in FIGS. 1 and 2. Stylus 60 further includes angularly graded reflecting surfaces 64 which are conical bodies disposed about the writing end 63 of the stylus 60.

The reflecting surfaces 64 are angled at ever increasing angles toward the writin end or point 63 so as to reflect a light beam coming from outside the pen upward through the transparent body 66 of the stylus, regardless of the angle at which the stylus 60 is held by a writer. The transparent tubular bodies 66 is further provided with an end cap 68 in which is disposed a focusing sphere 70 which focuses substantially all light channeled through the tubular body 66 from the reflecting surface 64 toward a light sensitive transistor or photocell 72.

The light sensitive transistor or photocell is connected through wires 74 and 75 to the circuitry of FIG. 7 so as to produce the timed impulses or step wave corresponding to the width W of the light beam.

Interposed between the light sensitive transistor or photocell 72 and one lead 75 is a switching means generally designated 76 which comprises a contact disc 78 which is embedded in the focusing sphere 70 and which is spaced from the metallic writing member 62. This spacing is maintained by a biasing spring 80 which bears upon an upset 82 in the writing member of insert 62. The other end of the biasing spring 80 bears against metallic cylinder or sleeve 84 which is connected to the wire 75. In operation, when the point 63 is pressed against a writing surface, not shown, the writing insert 62 is pushed against the bias of the spring 80 and contacts with the contact 78 to complete the connection between the lead wire 75 and the photocell or light sensitive transistor 72 through an intermediate wire 85. This arrangement is required so that the light sensitive transistor or photocell 72 is energized only when the stylus is being used to actually write on a writing surface.

Referring now to FIG. 8, an alternative embodiment for the stylus is disclosed. In this embodiment, light sensing stylus generally designated 90 includes a housing 91 adapted to receive a writing member 92 which may be of metal. Writing metal 92 is spring loaded and biased downwardly in a similar fashion to the embodiment of FIG. 6 and includes a mechanical switch generally designated 93 which functions similarly to the switch of the embodiment in FIG. 6. Stylus 90 includes a transmitter 94, which is shown in greater detail in FIG. 9 which is powered by batteries 95. A light sensor 96 is provided near the writing tip 97 of the stylus and is connected to the transmitter 94 for transmitting a step wave which is generated when light passes the light sensor 96. Writing member 92 may act as an antenna for transmitter 94 and transmit to a receiving antenna, which may be in the form of a foil 98, underlying the writing surface 2 and connected to a receiver 99. As hereinafter to be described, receiver 99 is connected to the lodgic circuit for inputting the step wave as information for the logic circuit. Turning now to FIG. 9, a schematic circuit is shown for the transmitter connection in the stylus 90. Light sensor 96 is connected to the circuit comprising batteries 95 and resistor 89. When light strikes light sensor 96, a signal is fed to transmitter 94 through a line 101 and transmitter 94 transmits a signal through antenna 92 to receiver 99.

The transmitter 94 preferably is of a tunnel diode type in order that it consumes a very small amount of current. To further conserve electrical current of the battery 95, the switch 93 allows operation only while the point 97 of the stylus 90 actually presses on the surface 2.

The Logic Circuit

Referring to FIG. 7, an exemplary logic circuit is shown for practicing the invention. The circuit for analyzing the data coming from the projector turntable and stylus is termed a "penverter digitizer interphase" or PDI, generally designated 101 in this application. The PDI receives information from the stylus and turntable and forms three sets of numbers which are fed to a micro processor or MPU 102, which in turn calculates the stylus movement along the writing surface 2 in terms of the x-y coordinates and time.

The turntable in a preferred embodiment of the circuit and invention, provides one reference pulse per rotation (restart phase) when the reference switch 40 is activated, and the stylus provides a "beam" pulse from its light sensor per lens of the turntable. The beam pulse is fed to the PDI either by wires 74, 75 (121 in FIG. 7) or the transmitter 94 which transmits to receiver 122 in the PDI.

The PDI then feeds a number to the MPU, corresponding to the number of the beams from 1 to 6 in the embodiment shown in FIGS. 3 to 5, which generates six beam pulses per rotation of the turntable. A number corresponding to the passage of the leading edge 50a of each beam is also fed to the MPU 102, as is a number corresponding to the passage of the trailing edge 50b. The passage of edges 50a and 50b represent the dark-to-light transition step on the light sensor and light-to-dark transition step respectively. Generally speaking, these three numbers from the PDI supply sufficient information to the MPU to calculate the x-y coordinates of the stylus point on the writing surface.

The PDI comprises two main circuit portions. One portion 103 amplifies the stylus beam pulses and uses them to "latch" information to the MPU. The other portion 104 is a counter circuit which generates the required numbers as defined above that are supplied to the MPU. Treating the counter circuit 104 first; this circuit comprises a pulse generator or clock 106 which operates in the example shown as 100 KHz, counters 108 to 112 which accumulate the pulses and latches 114 to 117 which provide the numbers counted in counters 108 to 112 upon request. Timed pulses originate at terminal 120 of clock 106, and these provide the clock input to the first four binary counters 108 to 111. These counters are connected and designed for cascade operation. Each counter is a 4-bit unit so that a total of 16 bits can be used to provide the generated number to the MPU. In operation each counter has an inout 108$i$ to 111$i$ and 4 outputs 108$a,b,c,d$ to 100$a,b,c,d$. The output 108$d$ is also connected to the input of the next counter 109$i$ to supply a clock pulse thereto and so on down the cascade series to input 111$i$ of counter 111. Each output of the counters is connected to a corresponding input (114$a,b,c,d$ to 116$a,b,c,d$) of a latch. Output 108$a$ therefore is connected to input 114$a$ and so on. Not that output 111$a$ is connected in input 117$d$ but that outputs 112$a,b$ and $c$ are connected to inputs 117$a$, $b$ and $c$ of the last latch.

The latching circuit provides 6 sets of two "latching pulses" per rotation of the turntable to the latches and a "reset pulse" every 6 "beam pulses" (or single rotation of the turntable). Also provided is a 3-bit beam number.

In the amplifier circuit portion 103 a pulse from the stylus is received at receiver 122 or alternately through line 121 shown in phantom. This enters a negative pulse to an inverting input 124 of operational amplifier 126.

The pulse is amplified from a 2 volt input to a 5 volt output at 127 and is inverted giving a positive pulse this provides an input at a non-inverting input of a comparator 128. This provides a compatible positive pulse to the inputs of a dual monostable multivibrator 130.

The monostable unit is preset to trigger on the positive edge of the incoming pulses and only the Schmitt trigger inputs 130$a$ and $b$ are used. This provides noise-free stability to the circuit.

The leading edge of the pulse at terminal 132 is a positive edge so it will produce a complete pulse in the monostable unit. It is inputed at 130$a$. A negative pulse edge is provided at the NOT output 130$c$.

The trailing edge of the pulse from the comparator 128 is a negative edge and not compatible with the monostable unit. Therefore, it is first inverted by a Schmitt inverter 132, with input 132$a$. The output 132$b$ provides a positive edge at the trailing side. This is inputed at 130$b$ of the monostable unit. The NOT output 130$d$ provides a second negative pulse on the trailing edge.

These two negative pulses are added (combined) in AND gate 134. The combined output at 134$a$ is also combined with one reference pulse every rotation at inputs 136$a,b$ of AND gate 136. At output 136$c$ there is formed the combination of 6 sets of two pulses and one reference pulse every rotation of the turntable. These 13 negative pulses are inverted by invertor 138 and applied to the input 139$b$ of multivibrator 139. This provides the clock pulses to a binary counter 140. Outputs 140$a,b$ and $c$ are added and produce a positive pulse on every thirteenth pulse received (one per revolution). This pulse is used to reset the counters through line 142.

The reference pulse enters at 144, which is here shown produced by a sensor 145. The input is inverted by invertor 146 and output is at 146$a$ which is inverted to a positive pulse. This positive pulse in inputed to unit 139 and produces a negative pulse at 139$c$ and a positive pulse at 139$d$. The negative pulse is added with two other stylus pulses in the AND gate 136 and is output to 136$c$. The positive pulse is used to reset the counter 140 once every revolution.

The microprocessor also requires information on which beam (1 to 6) of the PDI is sending information for. The leading edge of the stylus pulse provides the clock pulse for this. The output of the stylus pulse amplifier provides the input to the "beam number counter" 112 through line 148. Because the information is in numbers 1 to 6 only 3 bits of information are required. The outputs 112$a,b$ and $c$ only are therefore used.

Each latch 114 to 117 includes four outputs each, 114$e,f,g$ and $h$ to 117$e,f,g$ and $h$. Each of these outputs is connected to the microprocessor MPU, and this completes the circuit and operation of the device.

While specific embodiments have been shown and illustrated it is understood that the invention may be embodied otherwise without departing from such principles.

What is claimed is:

1. A digitizer for locating the position of a stylus point on a surface and converting it to digital information comprising, rotating light projector means for projecting a single light beam having two spaced apart light boundaries and for producing a first information impulse, light sensing stylus means for sensing the passing of said light boundaries and producing a second information impulse, and logic circuit means connected between said projector means and said stylus means for converting said first and second information impulses into digital information as to the position of said stylus, said projector means comprising a frame, a turntable rotatable on said frame, a light source connected to said frame adjacent said turntable, at least one elongated lense disposed on said turntable for focusing light coming from said light source into a substantially rectangular crossection light beam having spaced light edges which comprise said spaced apart light boundaries, said turntable further including at least one rectangular mirror disposed opposite said elongated lens for reflecting light coming from said light source toward said elongated lens.

2. A digitizer according to claim 1 wherein said rotating turntable further includes indexing means which comprises an indexing signal generator for producing said first information impulse when said rotating turntable is at a predetermined angular position on said frame.

3. A digitizer according to claim 1 wherein said frame further includes a non-reflective light barrier adjacent said light source for restraining all the light from reaching the lens directing before being reflected by the mirror.

4. A digitizer according to claim 1 wherein said frame includes indexing means adjacent said rotating turntable and said turntable includes indexing actuator means engagable with said indexing means to produce said first information impulse.

5. A digitizer according to claim 4 comprising a plurality of said elongated lenses disposed in a regular polygonal arrangement about said rotating turntable, each of said elongated lenses having disposed thereon one of a plurality of said rectangular mirror.

6. A digitizer according to claim 1 wherein said logic circuit means comprises an amplifier circuit portion for amplifying said first and second information impulses and converting them to digital information.

7. A digitizer according to claim 6 wherein said light sensing stylus means include a photo cell and said rotating turntable including indexing means for producing an indexing impulse, said indexing means and photo cell connected to said amplifying portion of said logic circuit, said amplifying portion of said logic circuit comprising an operational amplifier connected to said photo cell, a first clock pulse generation connected to said operational amplifier, a second clock pulse generator connected to said indexing means.

8. A digitizer according to claim 7 wherein said logic circuit includes a counter circuit comprising a series of counters connected in cascade, and wherein said clock pulse generator is connected to the beginning of said series, a plurality of latches each connected to one of said counters, and a microprocessor connected to said latches for converting said first and second information impulses into digital information.

9. A digitizer for locating the position of a stylus point on a surface and converting it to digital information comprising, rotating light projector means for projecting a single light beam having two spaced apart light boundaries and for producing a first information impulse, a light sensing stylus means for sensing the passing of said light boundaries and producing a second information impulse, and logic circuit means connected between said projector means and said stylus means for converting said first and second information impulses into digital information as to the position of said stylus, said light sensing stylus means comprising an elongated light transmitting body, a writing insert disposed within said body having a writing end and an opposite end, a plurality of angled reflecting bodies adjacent said writing end to reflect light coming from said rotating light projector means upwardly through said light transmitting body, and a photosensitive means adjacent said opposite end of said writing insert for producing an electronic impulse when light is channeled upwardly through said light transmitting body onto said light sensitive means, to produce said second information impulse.

10. A digitizer according to claim 9 further including a switching means disposed between said photosensitive means and said writing insert to enable said photosensitive means only when said writing end of said writing insert is contacted with the writing surface.

11. A digitizer according to claim 10 wherein said angled reflecting bodies comprises a plurality of conical reflective surfaces disposed about said writing insert adjacent said writing end thereof.

12. A digitizer according to claim 10 wherein said switching means comprises an electro-conductive sleeve disposed about said writing insert, a biasing spring disposed between said sleeve and said writing insert, said writing insert including an electro-conductive body, a contact means spaced from said opposite end of said writing insert and connected to said photosensitive means, said spring biasing said writing insert away from said contact means and writing insert being engagable with said contact means by pressing said writing end against the writing surface and against the bias of said spring to enable said photosensitive means.

13. A digitizer according to claim 10 wherein said photosensitive means comprises a photocell.

14. A digitizer according to claim 10 wherein said photosensitive means comprises a photosensitive transistor.

15. A digitizer according to claim 9 wherein said stylus means is connected to said logic circuit by wires.

16. A digitizer according to claim 9 wherein said stylus means includes a transmitter and said logic means includes a receiver and said second information is transmitted from said stylus means to said logic circuit through said transmitter and receiver.

17. A digitizer for locating the position of a stylus point on a surface and converting it to digital information comprising, rotating light projector means for projecting a single light beam having two spaced apart light boundaries and for producing a first information impulse, light sensing stylus means for sensing the passing of said light boundaries and producing a second information impulse, light sensing stylus means for sensing the passing of said light boundaries and producing a second information impulse, and logic circuit means connected between said projector means and said stylus means for converting said first and second information impulses into digital information as to the position of said stylus, said light sensing stylus means comprising a housing, a writing member axially aligned within said housing, a switch connected between said writing member and said housing for activation when said writing member is pressed against the writing surface, a transmitter in said housing connected to said switch, a light sensor disposed in said housing adjacent the end of said writing member, and battery means in said housing for powering said transmitter.

18. A digitizer according to claim 17 wherein said writing member comprises a metallic cylinder said metallic cylinder being an antenna connected to said transmitter.

19. A digitizer according to claim 18 wherein said receiver and said logic circuit includes an antenna which comprises a foil underlying said writing surface.

* * * * *